United States Patent
Weiss et al.

(10) Patent No.: US 8,891,803 B2
(45) Date of Patent: Nov. 18, 2014

(54) NOTEBOOK POWER SUPPLY WITH INTEGRATED SUBWOOFER

(75) Inventors: Vernon Weiss, Austin, TX (US); Brett Faulk, Cypress, TX (US); Kean W. Lam, Richmond Hill (CA); Richard W. Teltz, Hamilton (CA); Fang Hua, Hamilton (CA)

(73) Assignee: Flextronics AP, LLC, Broomfield, CO (US)

( * ) Notice: Subject to any disclaimer, the term of this patent is extended or adjusted under 35 U.S.C. 154(b) by 820 days.

(21) Appl. No.: 12/819,866

(22) Filed: Jun. 21, 2010

(65) Prior Publication Data

US 2010/0322441 A1    Dec. 23, 2010

Related U.S. Application Data

(60) Provisional application No. 61/219,696, filed on Jun. 23, 2009.

(51) Int. Cl.
*H04R 1/02* (2006.01)

(52) U.S. Cl.
USPC ............. 381/386; 381/344; 381/79; 439/345; 439/346

(58) Field of Classification Search
USPC ..................... 381/333–334, 388, 120, 77, 79; 439/345–346
See application file for complete search history.

(56) References Cited

U.S. PATENT DOCUMENTS

| | | |
|---|---|---|
| 4,184,197 A | 1/1980 | Cuk et al. |
| 4,273,406 A | 6/1981 | Okagami |
| 4,370,703 A | 1/1983 | Risberg |
| 4,563,731 A | 1/1986 | Sato |
| 4,645,278 A | 2/1987 | Yevak et al. |
| 4,712,160 A | 12/1987 | Sato et al. |
| 4,788,626 A | 11/1988 | Neidig et al. |
| 4,806,110 A | 2/1989 | Lindeman |
| 4,823,249 A | 4/1989 | Garcia, II |
| 4,841,220 A | 6/1989 | Tabisz et al. |
| 4,857,822 A | 8/1989 | Tabisz et al. |
| 4,866,367 A | 9/1989 | Ridley et al. |

(Continued)

FOREIGN PATENT DOCUMENTS

| | | |
|---|---|---|
| EP | 1146630 A2 | 10/2001 |
| GB | 2252208 A | 7/1992 |

(Continued)

OTHER PUBLICATIONS

International Search Report, PCT/US2011/49438, International filing date Aug. 26, 2011, 10 pages.

(Continued)

*Primary Examiner* — Disler Paul
(74) *Attorney, Agent, or Firm* — Haverstock & Owens LLP

(57) ABSTRACT

A portable electrical appliance comprises an audio signal source, a power supply module having a housing external to the portable electrical appliance for providing power to the electronic appliance having, a power converter for providing DC power to at least the portable electrical appliance, a speaker for generating sound and audio processing means for manipulating audio signals from the audio signal source, wherein the power converter, audio processing means and speaker are mounted within the housing, and communication means for coupling the audio signal to the processing means. The communication means is able to be wireless or wired.

55 Claims, 6 Drawing Sheets

(56) References Cited

U.S. PATENT DOCUMENTS

| | | |
|---|---|---|
| 4,890,217 A | 12/1989 | Conway |
| 4,893,227 A | 1/1990 | Gallios et al. |
| 4,899,256 A | 2/1990 | Sway-Tin |
| 5,065,302 A | 11/1991 | Kanazawa |
| 5,075,821 A | 12/1991 | McDonnal |
| 5,090,919 A | 2/1992 | Tsuji |
| 5,101,322 A | 3/1992 | Ghaem et al. |
| 5,132,890 A | 7/1992 | Blandino |
| 5,235,491 A | 8/1993 | Weiss |
| 5,325,283 A | 6/1994 | Farrington |
| 5,365,403 A | 11/1994 | Vinciarelli et al. |
| 5,373,432 A | 12/1994 | Vollin |
| 5,442,540 A | 8/1995 | Hua |
| 5,459,652 A | 10/1995 | Faulk |
| 5,673,185 A | 9/1997 | Albach et al. |
| 5,712,772 A | 1/1998 | Telefus et al. |
| 5,786,992 A | 7/1998 | Vinciarelli et al. |
| 5,790,395 A | 8/1998 | Hagen |
| 5,811,895 A | 9/1998 | Suzuki et al. |
| 5,838,554 A | 11/1998 | Lanni |
| 5,859,771 A | 1/1999 | Kniegl |
| 5,874,841 A | 2/1999 | Majid et al. |
| 5,905,369 A | 5/1999 | Ishii et al. |
| 5,923,543 A | 7/1999 | Choi |
| 5,949,672 A | 9/1999 | Bertnet |
| 5,978,238 A | 11/1999 | Liu |
| 6,009,008 A | 12/1999 | Pelly |
| 6,091,611 A | 7/2000 | Lanni |
| 6,183,302 B1 | 2/2001 | Daikuhara et al. |
| 6,191,957 B1 | 2/2001 | Peterson |
| 6,272,015 B1 | 8/2001 | Mangtani |
| 6,275,397 B1 | 8/2001 | McClain |
| 6,307,761 B1 | 10/2001 | Nakagawa |
| 6,323,627 B1 | 11/2001 | Schmiederer et al. |
| 6,385,059 B1 | 5/2002 | Telefus et al. |
| 6,388,897 B1 | 5/2002 | Ying |
| 6,390,854 B2 | 5/2002 | Yamamoto et al. |
| 6,396,716 B1 | 5/2002 | Liu et al. |
| 6,452,816 B2 | 9/2002 | Kuranuki |
| 6,459,175 B1 | 10/2002 | Potega |
| 6,487,098 B2 | 11/2002 | Malik et al. |
| 6,549,409 B1 | 4/2003 | Saxelby et al. |
| 6,618,274 B2 | 9/2003 | Boylan et al. |
| 6,650,552 B2 | 11/2003 | Takagi et al. |
| 6,654,261 B2 | 11/2003 | Welches et al. |
| 6,675,931 B2 | 1/2004 | Sahyoun |
| 6,721,192 B1 | 4/2004 | Yang et al. |
| 6,775,162 B2 | 8/2004 | Mihai et al. |
| 6,894,461 B1 | 5/2005 | Hack et al. |
| 6,899,434 B2 | 5/2005 | Morishita |
| 6,919,715 B2 | 7/2005 | Muratov et al. |
| 6,989,997 B2 | 1/2006 | Xu |
| 7,035,126 B1 | 4/2006 | Lanni |
| 7,038,406 B2 | 5/2006 | Wilson |
| 7,102,251 B2 | 9/2006 | West |
| 7,139,180 B1 | 11/2006 | Herbert |
| 7,202,640 B2 | 4/2007 | Morita |
| 7,208,833 B2 | 4/2007 | Nobori et al. |
| 7,212,420 B2 | 5/2007 | Liao |
| 7,239,532 B1 | 7/2007 | Hsu et al. |
| 7,274,175 B2 | 9/2007 | Manolescu |
| 7,315,460 B2 | 1/2008 | Kyono |
| 7,386,286 B2 | 6/2008 | Petrovic et al. |
| 7,450,388 B2 | 11/2008 | Beihoff et al. |
| 7,499,301 B2 | 3/2009 | Zhou |
| 7,545,256 B2 | 6/2009 | O'Toole et al. |
| 7,564,706 B1 | 7/2009 | Herbert |
| 7,596,007 B2 | 9/2009 | Phadke |
| 7,701,305 B2 | 4/2010 | Lin et al. |
| 7,830,684 B2 | 11/2010 | Taylor |
| 7,924,578 B2 | 4/2011 | Jansen et al. |
| 8,059,434 B2 | 11/2011 | Huang et al. |
| 8,102,678 B2 | 1/2012 | Jungreis |
| 8,125,181 B2* | 2/2012 | Gregg et al. ............... 320/104 |
| 8,126,181 B2* | 2/2012 | Yamamoto et al. ........... 381/333 |
| 8,134,848 B2 | 3/2012 | Whittam et al. |
| 8,155,368 B2* | 4/2012 | Cheung et al. ............... 381/374 |
| 8,194,417 B2 | 6/2012 | Chang |
| 8,207,717 B2 | 6/2012 | Uruno et al. |
| 8,213,666 B2* | 7/2012 | Groesch ................... 381/376 |
| 8,243,472 B2 | 8/2012 | Chang et al. |
| 8,344,689 B2* | 1/2013 | Boguslavskij ............. 320/108 |
| 8,369,111 B2 | 2/2013 | Balakrishnan et al. |
| 8,400,801 B2 | 3/2013 | Shinoda |
| 2002/0008963 A1 | 1/2002 | Dibene, II et al. |
| 2002/0011823 A1 | 1/2002 | Lee |
| 2002/0036200 A1 | 3/2002 | Ulrich |
| 2003/0035303 A1 | 2/2003 | Balakrishnan et al. |
| 2003/0112645 A1 | 6/2003 | Schlecht |
| 2004/0008532 A1 | 1/2004 | Asawa |
| 2004/0183510 A1 | 9/2004 | Sutardja et al. |
| 2004/0252529 A1 | 12/2004 | Huber et al. |
| 2005/0024016 A1 | 2/2005 | Breen et al. |
| 2005/0036338 A1 | 2/2005 | Porter et al. |
| 2005/0117376 A1 | 6/2005 | Wilson |
| 2005/0138437 A1 | 6/2005 | Allen et al. |
| 2005/0194942 A1 | 9/2005 | Hack et al. |
| 2005/0225257 A1 | 10/2005 | Green |
| 2005/0254268 A1 | 11/2005 | Reinhard et al. |
| 2006/0002155 A1 | 1/2006 | Shteynberg et al. |
| 2006/0022637 A1 | 2/2006 | Wang et al. |
| 2006/0109696 A1 | 5/2006 | Ren et al. |
| 2006/0152947 A1 | 7/2006 | Baker |
| 2006/0213890 A1 | 9/2006 | Kooken et al. |
| 2006/0232220 A1 | 10/2006 | Melis |
| 2007/0040516 A1 | 2/2007 | Chen |
| 2007/0051712 A1 | 3/2007 | Kooken et al. |
| 2007/0087784 A1 | 4/2007 | Yamamoto et al. |
| 2007/0120542 A1 | 5/2007 | LeMay |
| 2007/0121981 A1* | 5/2007 | Koh et al. ................ 381/334 |
| 2007/0138971 A1 | 6/2007 | Chen |
| 2007/0247091 A1 | 10/2007 | Maiocchi |
| 2007/0247877 A1 | 10/2007 | Kwon et al. |
| 2007/0263415 A1 | 11/2007 | Jansen et al. |
| 2007/0287447 A1* | 12/2007 | Cornell ................... 455/431 |
| 2007/0298653 A1* | 12/2007 | Mahoney et al. ............. 439/578 |
| 2008/0018265 A1 | 1/2008 | Lee et al. |
| 2008/0043496 A1 | 2/2008 | Yang |
| 2008/0191667 A1 | 8/2008 | Kernahan et al. |
| 2009/0034299 A1 | 2/2009 | Lev |
| 2009/0196073 A1 | 8/2009 | Nakahori |
| 2009/0290384 A1 | 11/2009 | Jungreis |
| 2009/0290385 A1 | 11/2009 | Jungreis et al. |
| 2009/0300400 A1 | 12/2009 | DuBose |
| 2010/0039833 A1 | 2/2010 | Coulson et al. |
| 2010/0317216 A1* | 12/2010 | Pocrass ................... 439/345 |
| 2011/0132899 A1 | 6/2011 | Shimomugi et al. |
| 2012/0112657 A1 | 5/2012 | Van Der Veen et al. |

FOREIGN PATENT DOCUMENTS

| | | |
|---|---|---|
| JP | 4217869 A | 8/1992 |
| JP | 10243640 A | 9/1998 |
| JP | 2000083374 A | 3/2000 |
| JP | 2000253648 A | 9/2000 |
| JP | 2004208357 A | 7/2004 |

OTHER PUBLICATIONS

"New Architectures for Radio-Frequency dc/dc Power Conversion", Juan M. Rivas et al. Laboratory for Electromagnetic and Electronic Systems, Massachusetts Institute of Technology, Room 10-171, Cambridge, MA. 02139, pp. 4074-4084.

"Novel Zero-Voltage and Zero-Current Switching (ZVZCS) Full-Bridge PWM Converter Using Coupled Output Inductor", Hang-Seok Choi et al., IEEE Transactions on Power Electronics, vol. 17, No. 5, Sep. 2002, pp. 641-648.

"Team Claims Midrange Wireless Energy Transfer", R. Colin Johnson, EETimes.com dated Nov. 20, 2006, 3 pages.

"Wireless Beacon Could Recharge Consumer Devices", R. Colin Johnson, EETimes.com dated Jan. 11, 2007, 2 pages.

(56) References Cited

OTHER PUBLICATIONS

Scoshe, The Necessary Accessory, Scosche Industries, www.scosche.com, Jan. 4, 2010, 2 pages.

www.realm-audio.com, copyright 2007 Realm-Audio, Inc., 1 page, Jan. 4, 2010.

www.earthquakesound.com, Earthquake Sound., 1 page, Jan. 4, 2010.

Application No. 201010265578.1, Date of Notification Jan. 14, 2014, First Office Action, 22 pages.

* cited by examiner

NOTEBOOK POWER SUPPLY WITH INTEGRATED SUBWOOFER

RELATED APPLICATIONS

This application claims priority of U.S. provisional application Ser. No. 61/219,696, filed Jun. 23, 2009, and entitled Notebook Power Supply with Integrated Subwoofer," by these same inventor. This application incorporates U.S. provisional application Ser. No. 61/219,696 in its entirety by reference.

FIELD OF THE INVENTION

The present invention relates to portable electrical devices. More particularly, the present invention relates to providing enhanced audio in portable computers.

BACKGROUND

Users of portable electrical appliances such as laptops and tablet computers are generally required to make a choice with regard to the quality of the audio supplied by the devices. The first option is using a set of headphones. While this option may provide acceptable audio for a single user, in general multiple users are not able to enjoy the audio. In general, most devices do not have multiple headphone outputs, so a splitter must be used. As a result, the available power to each set of headphones is reduced. Another option for multiple users to hear the audio from an appliance is to use the on board speakers that accompany most devices. However, due to space constraints, these speakers are generally of the smallest form factor possible. Therefore, they are not able to reproduce the full dynamic range of audio. As a result, the sound generated from such speakers is generally bandlimited, resulting in a tinny, unpleasant sound. Furthermore, the speakers are generally underpowered, users must be close by in order to properly hear the audio. Another option is to use external powered speakers. Although the use of external powered speakers solves the problem of underpowered, poor quality audio, it introduces the new problem of large, external devices that must be coupled to the electronic appliance. Also, external powered speakers generally require their own separate power source. What is needed is an audio system for electronic appliances, particularly portable devices such as laptops and tablet PCs, that allows for enhanced audio without adding components.

SUMMARY OF THE INVENTION

What is provided are devices to achieve full, dynamic, high quality audio from an electrical appliance, such as a portable computer. Advantageously, the power supply of the appliance comprises a speaker. Audio signals are able to be transmitted to the power supply by wire or wirelessly, by any convenient, known or application specific protocol such as Bluetooth, or any other wireless connectivity standard. Because of the size of most power supplies commonly available, a larger speaker, with respect to the small speakers in some electrical appliances, is able to be used. As a result, deep, rich bass sounds are able to be provided without the addition of extra components, such as external amplified speakers. The instant invention is able to be used to reinforce existing audio components on a portable device. Alternatively, the invention is able to serve as a hub for a surround sound system. Persons of ordinary skill having the benefit of this disclosure will readily recognize alternative embodiments and applications.

In one aspect of the invention, a power supply for an electrical appliance comprises a power converter for providing power to the electrical appliance, a speaker for generating sound; and a communication means for coupling at least one audio signal from the electrical appliance to the speaker. The audio signal is able to be analog or modulated to comprise digital data. In some embodiments, the communication means comprises a power cable that delivers power to and from the power converter. In such embodiments, modulated audio data is able to be transmitted over the power cable and demodulated in the power supply. Preferably, the power supply further comprises a driver for amplifying the audio signal. The power converter is able to provide power to the driver as well as the electronic appliance. When external power is unavailable, the power converter is able to take power from a battery on board the appliance and power the driver. The driver is able to be a Class A/B amplifier, a Class D amplifier, or any other known, convenient or application specific driver.

In embodiments where the audio signal is transmitted to the power supply over a wire, the wire preferably comprises a connector for coupling to the electronic appliance. The connector includes an audio jack electrically coupled to the at least one wire and a power jack coupled to the power cable. In some embodiments, the power jack substantially circumscribes the audio jack. Alternatively, the power jack and audio jack are integrally formed. Still alternatively, the audio jack is adjacent to the power jack. In embodiments where the audio signal is transmitted wirelessly, the communication means is able to be infrared receiver, a bluetooth receiver, or any other known or convenient wireless receiver.

In another aspect of the invention, a system comprises an electrical appliance having an external power supply module and a communication means for coupling audio data from the electronic appliance to the speaker. Preferably, the power supply module includes a power converter for converting an available power to an appropriate power for the electronic appliance and a speaker for generating sound. In some embodiments, the electrical appliance is able to transmit digital audio data over a power supply cable to the communications means. Preferably, the power supply module also includes a driver for amplifying the audio signal. The power converter provides power to the driver. The driver is able to be a class A/B amplifier, a Class D amplifier, or any other known, convenient or application specific driver.

In some embodiments, the communication means comprises at least one wire. To accommodate the at least one wire, the electrical appliance comprises a female connector having a receptacle for a power connector and a receptacle for an audio connector. In some connectors, the receptacle for a power connector substantially circumscribes the receptacle for the audio connector. In other embodiments, receptacle for a power connector is adjacent to the receptacle for the audio connector. In order to couple to the electrical appliance, the power supply module comprises a connector for coupling to the electronic appliance. Preferably, the connector has an audio jack electrically coupled to the at least one wire, and a power jack coupled to a power cable. Similarly, the power jack may be adjacent to the audio jack or at substantially circumscribe the audio jack. The person of ordinary skill having the benefit of this disclosure will readily appreciate several known, standard or application specific receptacles and connectors are readily useable.

In some embodiments, the communication means comprises a wireless transmitter mounted to the portable electronic appliance, and a wireless receiver mounted to the power supply module. The transmitter and receiver are able to use any known, convenient or applications specific wireless communication protocol or technique, such as infrared, bluetooth, or the like.

Other features and advantages of the present invention will become apparent after reviewing the detailed description of the embodiments set forth below.

BRIEF DESCRIPTION OF THE DRAWINGS

The accompanying drawings, which are incorporated in and form a part of this specification, illustrate embodiments of the invention and, together with the description, serve to explain the principles of the invention, but not limit the invention to the disclosed examples.

The present invention is described relative to the several views of the drawings. Where appropriate and only where identical elements are disclosed and shown in more than one drawing, the same reference numeral will be used to represent such identical elements.

DETAILED DESCRIPTION OF THE PRESENT INVENTION

Reference will now be made in detail to the embodiments of the electromagnetic shielding method and apparatus of the invention, examples of which are illustrated in the accompanying drawings. While the invention will be described in conjunction with the embodiments below, it will be understood that they are not intended to limit the invention to these embodiments and examples. On the contrary, the invention is intended to cover alternatives, modifications and equivalents, which may be included within the spirit and scope of the invention as defined by the appended claims. Furthermore, in the following detailed description of the present invention, numerous specific details are set forth in order to more fully illustrate the present invention. However, it will be apparent to one of ordinary skill in the prior art having the benefit of this disclosure that the present invention may be practiced without these specific details. In other instances, well-known methods and procedures, components and processes haven not been described in detail so as not to unnecessarily obscure aspects of the present invention. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1A:
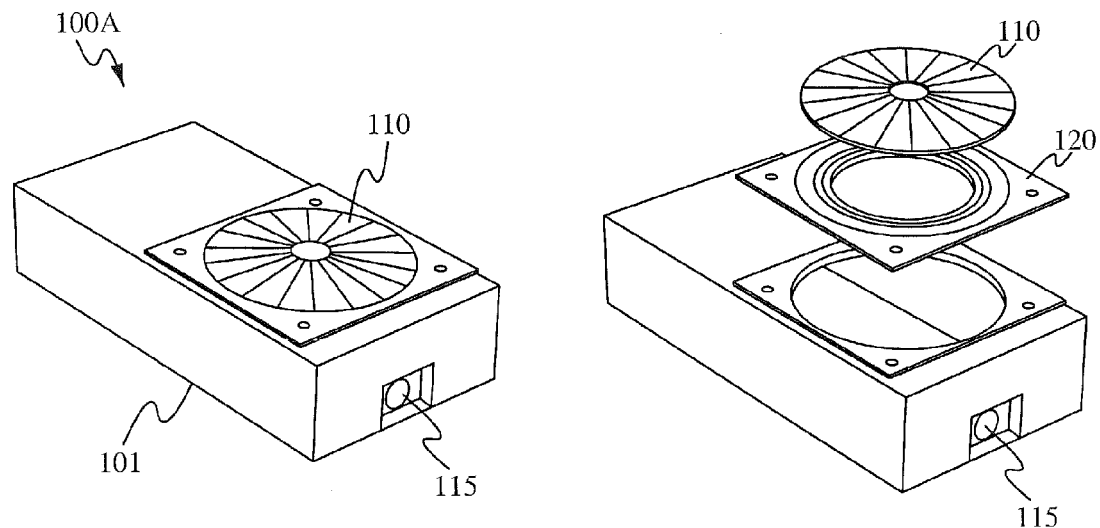
FIG. 1A is an exemplary embodiment of a power supply per the current invention.
Figure 1B:
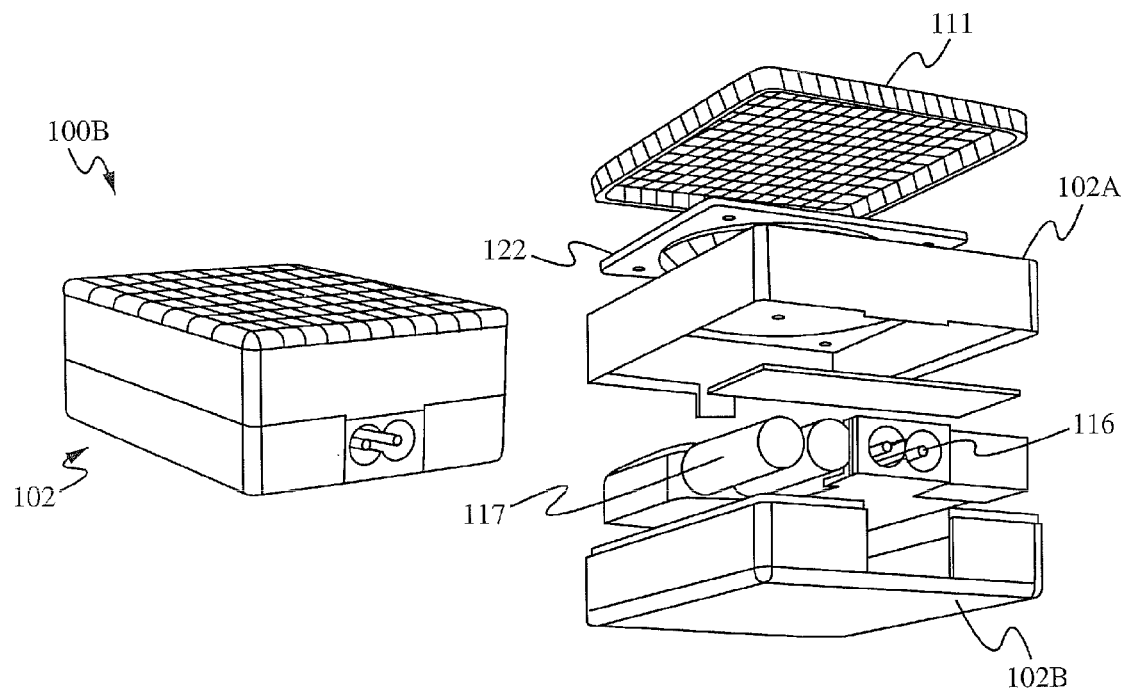
FIG. 1B is an exemplary embodiment of a power supply per the current invention.

FIGS. 1A and 1B show exemplary embodiments of a power supply per an aspect of this invention. In FIG. 1, a power supply 100A is shown in a complete and an exploded view. A power supply 100A comprises a housing 101. Mounted on or within the housing 101, the power supply includes a speaker 120. The speaker 120 is able to be a subwoofer, midrange, or any other type of speaker. With respect to construction, the speaker 120 is able to be a standard coil driven cone speaker, piezoelectric speaker, ceramic speaker, or any other known or application specific speaker. A speaker Grill 110 is able to protect the speaker 120 from damage. The power supply 100A further comprises a female plug 115 for receiving the male connector of a standard power cord (not shown). Such power cords are readily available and the male connectors are of a standard form factor. FIG. 1B shows an alternate embodiment of a power supply 100B. The power supply 100B comprises a two part housing 102 that is constructed from a top member 102A and a bottom member 102B. The top member 102A supports a speaker 122 and a speaker grill 111 for protecting the speaker. As mentioned above, the speaker 122 is able to be any known or convenient type of speaker. Preferably, the power supply 100 comprises a power converter 117. The power converter 117 is able to be a switching type converter, or a standard transformer based power converter, or any other convenient type of converter. The power supply 100B has a female receptacle 116 for receiving the male connector of a standard power plug. Advantageously, the power plugs connector 116 is backwards compatible with standard power cords. In alternate embodiments, the power supply 100 comprises additional speakers mounted to the housing. Still alternatively, the power supply 100 is able to have outputs for coupling additional speakers. The power supplies 100A and 100B further comprise a communication means for receiving audio signals from an electrical appliance, such as a laptop computer. The communication means is able to be wired or wireless. The communication means couples audio signals to an amplifier for driving the speaker 120 and 122. The power converter 116 is able to provide DC power to the communication means and amplifier. In some embodiments, the audio data is modulated or encoded digitally. In such embodiments, the power supply comprises an appropriate demodulator or decoder. Specific examples of both wired and wireless communication means are shown in FIGS. 2-7.

Figure 2A:
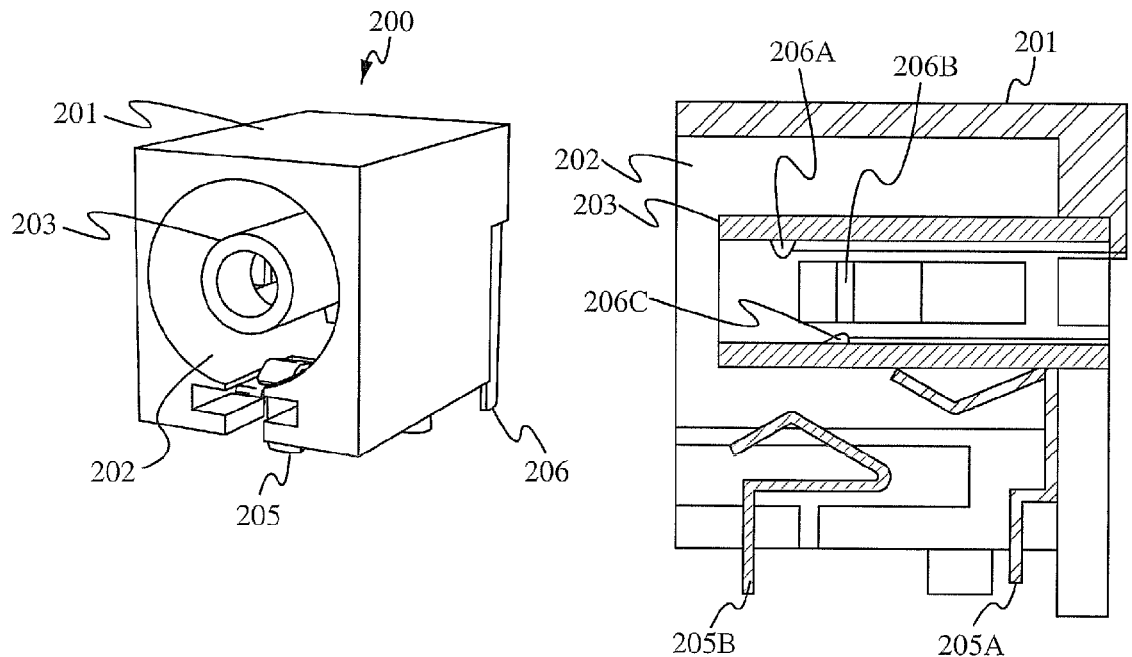
FIG. 2A is an exemplary embodiment of a combined signal and power connector.
Figure 2B:
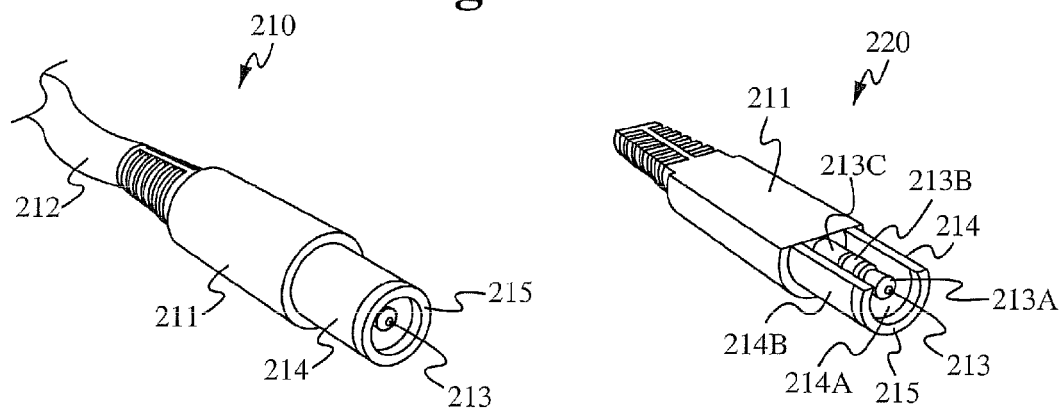
FIG. 2B is an exemplary embodiment of a combined signal and power connector.

FIGS. 2A and 2B show several exemplary embodiments of connectors and receptacles, for coupling the power supplies 100A and 100B in FIGS. 1A and 1B respectively to an electrical appliance respectively, such as a laptop computer (not shown). FIG. 2A shows a female connector 200 that is able to receive a male connector 210 in both full and cross section views. The male connector 210 comprises two jacks: an audio jack 213 and a power jack 214. The power jack 214 circumscribes the audio jack 213. The female connector 200 comprises a housing 201. Preferably, the female connector 200 is configured to be backwards compatible with existing form factors of female connectors that are readily available in the marketplace. The housing 201 comprises an opening 202. The opening 202 is configured to receive a power jack 214 on the connector 210. The female receptacle 200 comprises contacts 205 for power and 206 for audio signals. In the cross sectional view, a ground contact 205B is present on the outside surface of the cavity defined by the opening 202. Along the outside of the protruding member 203, a "hot" contact 205A is present. The "hot" contact is named so because it generally carries current. The protruding member 203 is configured to receive a standard ⅛ inch audio jack 213. Such audio jacks 213 are known as "TRS" jacks or "Tip Ring Sleeve" jacks because there are three distinct and electrically isolated (with respect to each other) areas of contact: the tip 213A, the ring 213B, and the sleeve 213C. In stereo connections, it is standard that the tip carry the right channel audio signal, the ring carry the left audio signal, and the sleeve provide the ground. Advantageously, the tip 213A is able to make electrical contact with a tip contact 206A, the ring 213B with a ring contact 206B, and the sleeve 213C with a sleeve contact 206C. The power jack 214 is able to be electrically isolated by a barrier 215 with respect to its inner surface 214A and its outer surface 214B so that one is able to be a "hot" or current carrying surface and one is able to be a ground connection. For the sake of safety, it is desirable that the outer surface 214B provide a ground contact surface and the inner surface 214A provide a "hot" contact surface so that any incidental contact will not cause unwanted current flow. What is achieved is a power interconnect with signal interconnect in a compact form factor for effectuating the transmission of power out of the connector and effectuating the transmission of a stereo audio signal for driving the speaker into the connector. It will be apparent to those of ordinary skill having the benefit of this disclosure that a variety of signals are able to be transmitted over the TRS jack 213. Preferably, a power cable and a signal wire are housed in a single sheath 212. Alternatively, other jacks are able to be implemented to conform to specific applications as necessary.

Figure 2C:
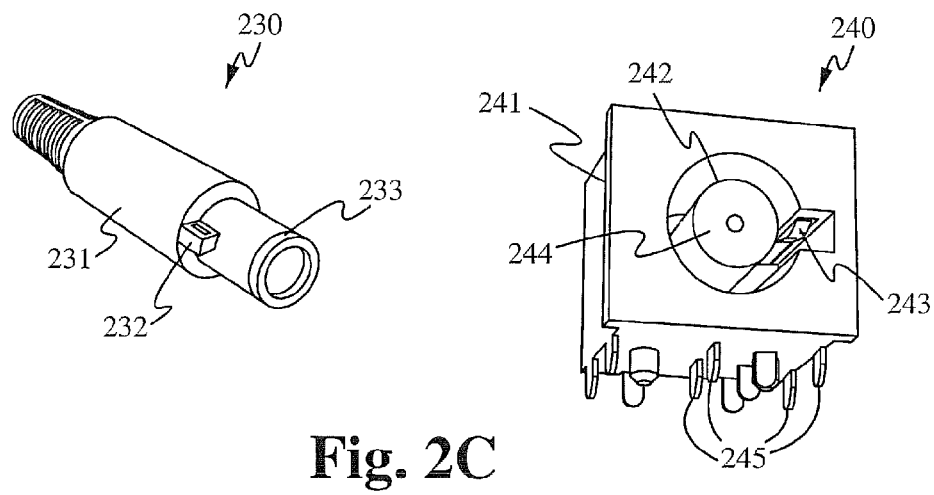
FIG. 2C is an exemplary embodiment of a combined male signal and power connector, and a female receptacle.

FIG. 2C shows an alternate embodiment of a female receptacle 240 and the combined male signal and power connector 230. The connector 230 comprises a housing 231 from which a power jack 233 emanates. The power jack 233 is able to be similar to the power jack 214, having a "hot" contact inner surface and a ground contact outer surface. The housing comprises a signal jack 232. The power jack 233 and signal jack 232 are adjacent to one another. Alternatively, the signal jack 232 and power jack 233 are able to be integrally formed. The signal jack is able to have multiple points of contact that are insulated with respect to each other, to carry, for example, a left and right audio channel, digital bitstreams, or any other useful signals. The female receptacle 240 comprises an opening 242 configured to receive the power jack 233. Preferably, the opening 242 has an extension 243 to receive the signal jack 232. A plurality of board contacts 245 are able to carry any of the signals and power to and from the electrical appliance.

Still alternatively, an audio signal is able to be sent directly over the power connection and over a power cable to the power supplies 100A and 100B of FIGS. 1A and 1B respectively. Because the power supplied by the power supply 100 is generally DC, a digital bitstream representing audio data, or a modulated audio signal is able to be sent directly over the DC power signal without ill effect to the audio signal or audio data. On the power supply 100, a demodulator or digital decoder is able to separate the audio signal or digital bitstream from the DC power signal.

Figure 3:
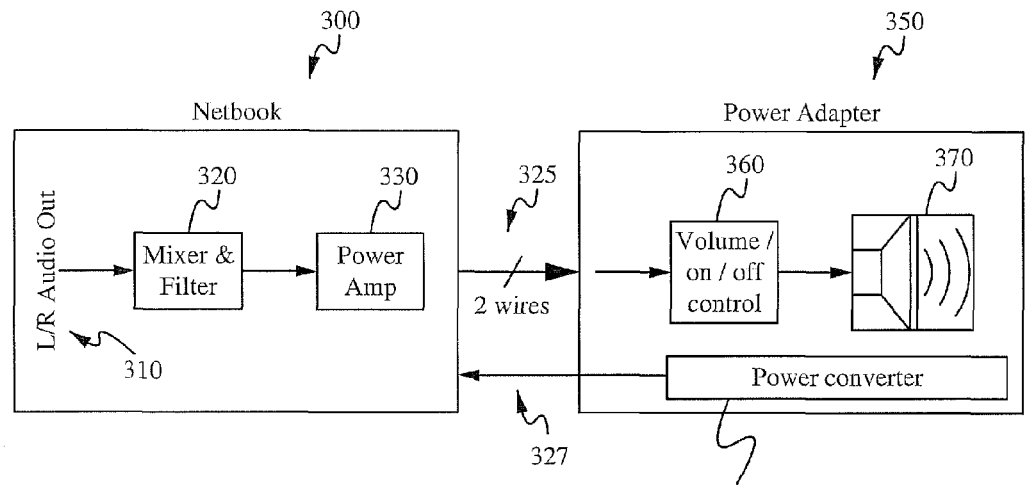
FIGS. 3-7 are several exemplary embodiments of systems per the current invention.
Figure 4:
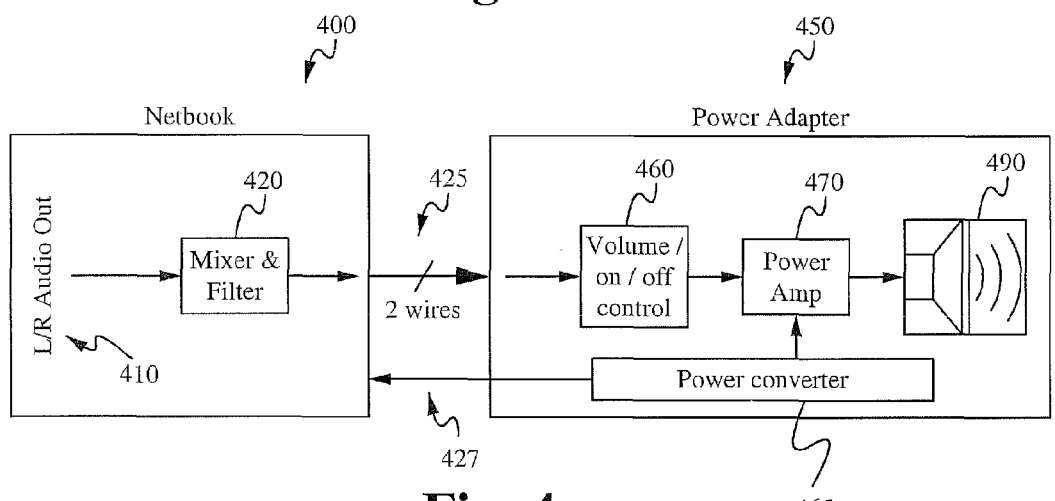

FIGS. 3-7 show various system embodiments of the present invention. FIG. 3 shows a first exemplary embodiment. An electrical appliance 300 is able to be a portable computer, tablet PC, music player, or the like. The electrical appliance 300 is coupled by a wired connection to a power supply 350. The electrical appliance 310 comprises a left/right audio output 310 able to generate an audio signal. Optionally, a mixer/filter 320 is supplied to manipulate the audio signal as desired, for example changing sonic characteristics. The appliance further comprises an audio power amplifier 330. The power amplifier 330 is able to be a class any well known speaker driver or amplifier circuit, such as an A/B amplifier or Class D amplifier. The power amplifier 330 is able to transmit an amplified audio signal over a 2 wire connection 325 provides a communication means for coupling audio signals to the speaker 370. Preferably, the power supply comprises a power converter 365 for converting an available power, for example 120 VAC from a US wall socket, to an appropriate DC power for the electrical appliance 300 and transmits the DC power over a power cable 327. In some embodiments, the DC power cable 327 and the 2 wire audio signal cable 325 are able to be housed in a single cable casing. A connector, such as the ones described in FIGS. 2A and 2B are able to provide coupling. Optionally, the power supply 350 comprises a volume and on/off control 360. Alternatively, the volume control and on/off 360 is able to be on board the electrical appliance 300. The Volume control 360 is coupled to and drives a speaker 370. FIG. 4 shows an alternate embodiment wherein an L/R audio output 410 on board an electrical appliance 400 provides an audio signal to an optional mixer and filter 420. A 2 wire connection 425 provides a communication means for coupling the audio signal to a volume control and on/off control 460 on board the speaker 490. A power amplifier 470 amplifies the audio signal and transmits the audio signal to a speaker 490. A power converter 465 provides DC power to the appliance 400 and the power amplifier 470.

Figure 5:
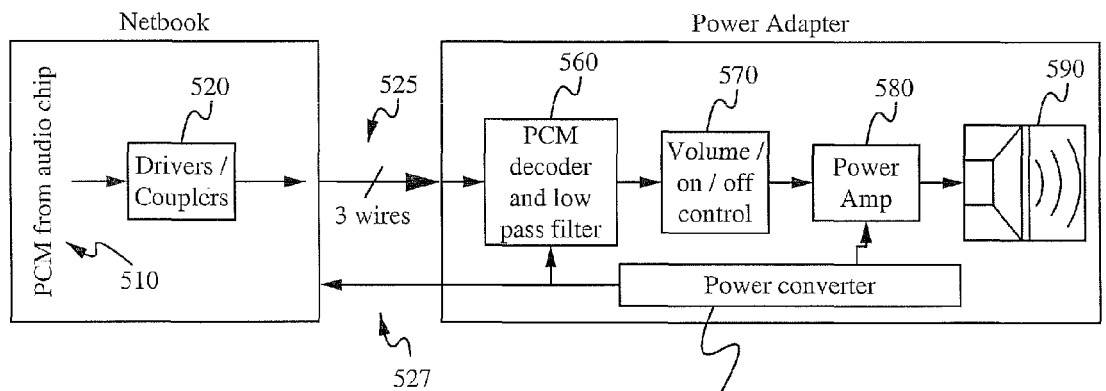
Figure 6:
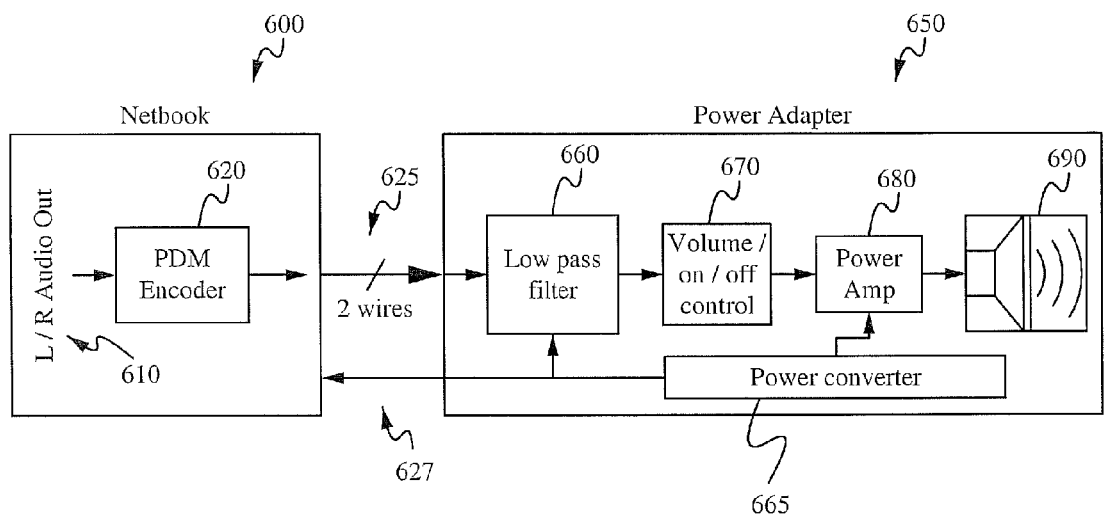

In the embodiment shown in FIG. 5, a PCM output 510 in an electrical appliance 500 provides a digital audio signal. Pulse-code modulation (PCM) is a digital representation of an analog signal, such as audio, where the magnitude of the signal is sampled regularly at uniform intervals, then quantized to a series of symbols in a numeric (usually binary) code. Generally, PCM data is provided by a CD player or other digital audio playback means. A driver/coupler 520 transmits digital data over a 3 wire connection 525 to a PCM decoder 560 on board the power supply 550. The PCM decoder 560 decodes the digital audio signal and provides analog audio to an optional volume and on/off control 570. The analog audio signal is amplified by a power amplifier 580. As mentioned above, the power amplifier is able to be any convenient type of audio driver. The power amplifier 580 transmits the amplified audio signal to a speaker 590. As in the embodiments described above, a power converter 565 provides DC power to the appliance 500. The power converter 565 is also able to provide DC power to the PCM decoder 560 and the power amplifier 580. FIG. 6 shows an embodiment wherein an encoder 620 modulates an analog L/R audio signal 610 on board an electrical appliance 600. The encoder 620 is able to be a pulse density modulator (PDM), sigma delta modulator, or any other known or useful modulator or encoder. The modulated audio signal is transmitted over a 2 wire connection 625 to a demodulator/low pass filter 660 on board the power supply 650. As in the embodiments above, a volume control and on/off 670 manipulate the gain of the audio signal and a power amplifier 680 drives a speaker 690. In some embodiments, digital data is able to be sent over the power cable 627. Because the power carried over the power cable 627 is DC, digital data such as PCM or a PDM audio signal are able to be carried across the cable 627 with no ill effect. The demodulator 620 of FIG. 6 or the decoder 520 of FIG. 5 is able to separate the audio signal from the DC power signal. Advantageously, such an embodiment obviates the need for any special connector or wireless interface.

Figure 7:
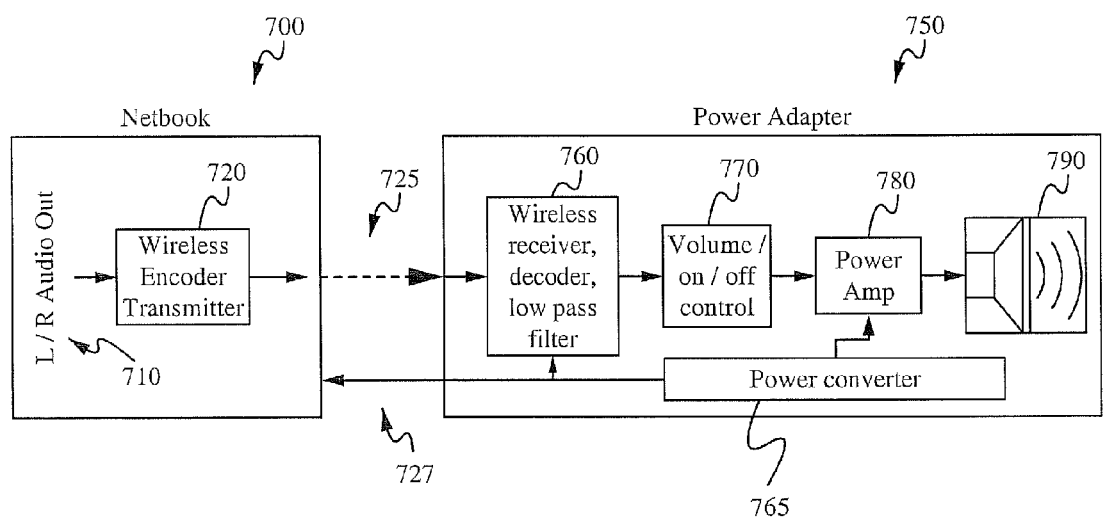

FIG. 7 shows an alternate wireless embodiment of the invention. An electrical appliance 700 comprises an L/R audio source 710. The audio source 710 is coupled to a wireless modulator/encoder 720. The modulator/encoder and a demodulator/decoder 760 on board the power supply form a wireless transmission link between the appliance 700 and the power supply 750. The wireless transmission link is able to be an infrared transmission link, an RF transmission link, a Bluetooth transmission link, or any other useful wireless transmission link or wireless communication protocol. The demodulator/decoder 760 provides an analog audio signal to a volume and on/off control 770. The audio signal is transmitted to a power amplifier 780 which drives a speaker 790. A power converter 765 provides DC power to the appliance 700. The power converter 765 also provides DC power to the demodulator/decoder 760 and power amplifier 780. As mentioned above, the power amplifier is able to be a Class A/B amplifier, Class D amplifier, or any other known, convenient or application specific driver.

The person of ordinary skill having the benefit of this disclosure will appreciate that the embodiments of FIGS. 3-7 are able to be configured in any number of ways. Each embodiment shown in FIGS. 3-7 includes audio processing means for manipulating audio signals from an audio signal source. The audio processing means includes a decoder, a demodulator, a mixer, a filter, a volume control, an on/off switch, or a combination thereof. The communication means is able to be wireless or wired. Optionally, additional speakers and additional amplifiers are able to be included, or alternatively outputs for coupling additional external speakers are able to be included. Speakers of different kinds are able to be incorporated for effectuating "surround sound" effects. Although the power supplies shown generally serve to convert power from a wall socket to the electrical appliance, DC power from a battery within the electrical appliance is able to power the amplifiers to drive the speaker when an external wall power source is not available.

Figure 8:
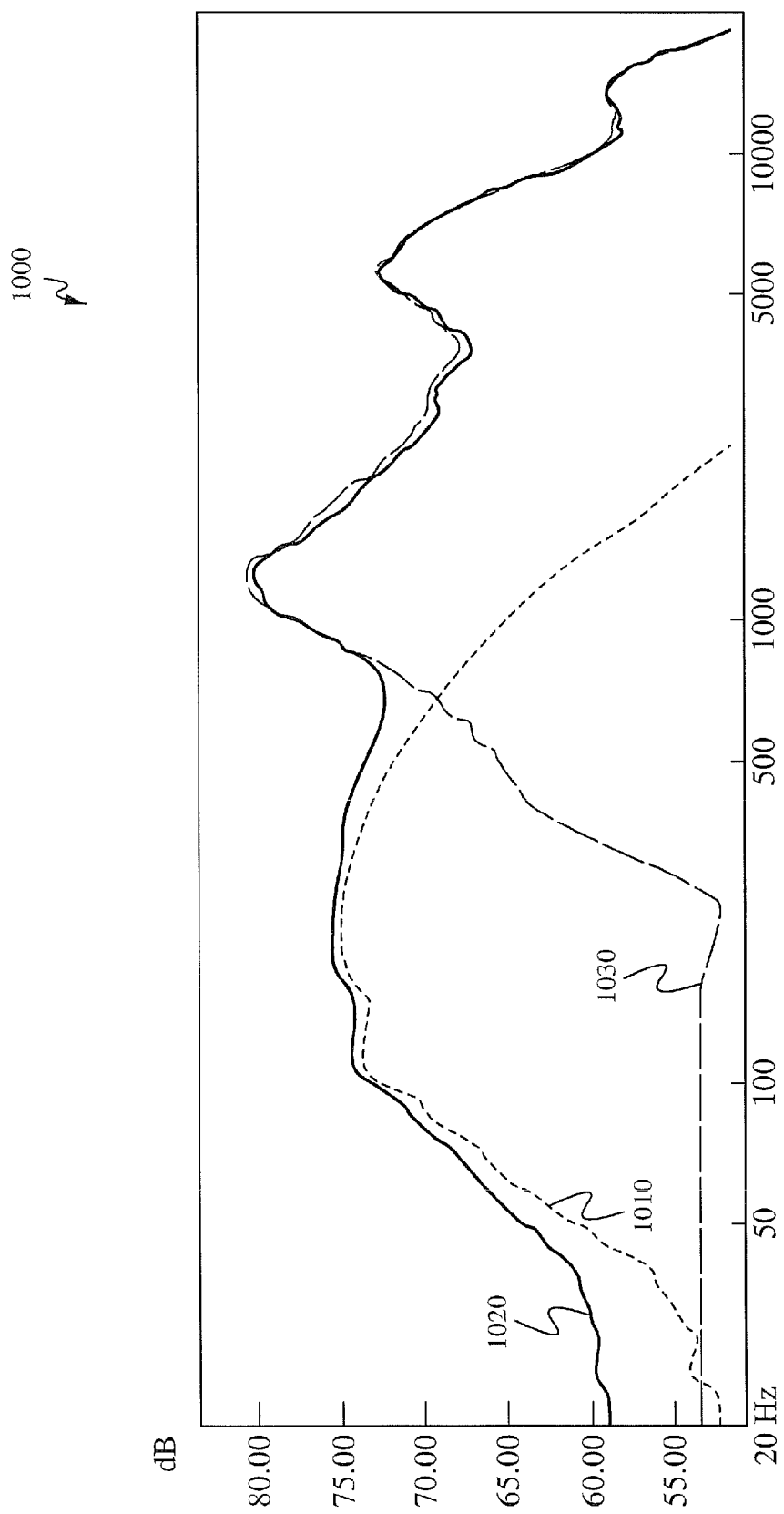
FIG. 8 is a graph showing experimental results of this invention.
Figure 9:
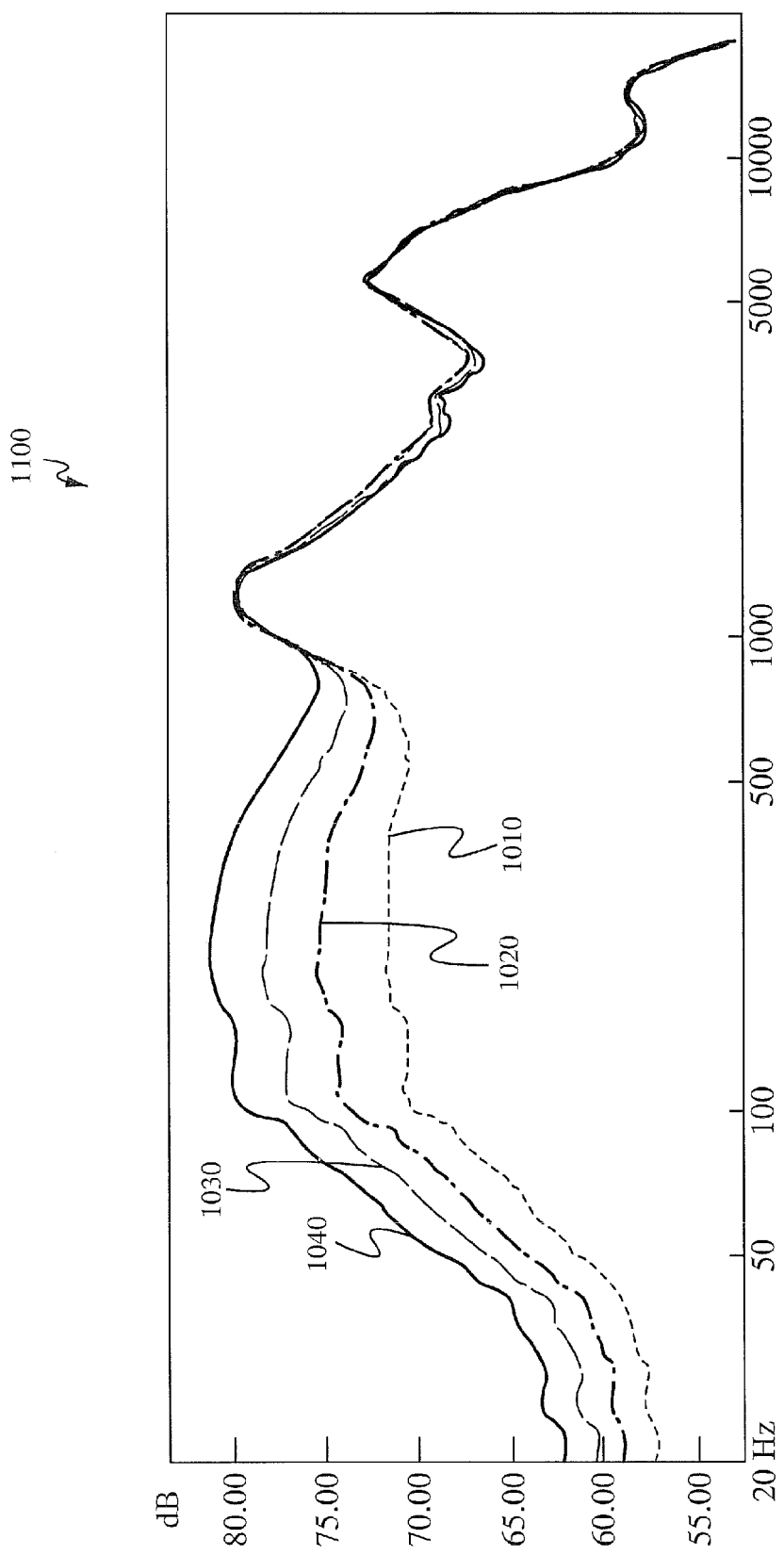
FIG. 9 is a graph showing experimental results of this invention.

FIGS. 8 and 9 show measured performances of the current invention. Both are measured sound pressure in dB at a fixed distance from a portable laptop computer having standard integrated speakers as well as a power supply having a speaker mounted thereon, such as the embodiments 100A and 100B of FIGS. 1A and 1B respectively. FIG. 10 is a graphical representation of sound quality of standard laptop speakers by themselves, the power supply having a speaker by itself, and their combined audio output. The X axis is a logarithmic frequency axis starting at 20 Hz and ending at 20 kHz, which is the range generally accepted as the best case hearing range of humans. The Y axis is sound pressure as measured in decibels at a fixed distance from the laptop computer. The first slope 1030 is the representation of the audio output of only the laptop's on board speakers. The low frequency output is especially poor. The low frequency response is low and flat until approximately 300 Hz. This results in the tinny, unpleasant audio sound described above. Because of the form factor restrictions on the type of speakers that are able to be incorporated into the body of a laptop computer, the amount of amplification of the audio signal generally does not improve the audio quality. This is because the speakers themselves are not able to reproduce the low end of the hearing spectrum with any acceptable accuracy because of their size restriction. Greater amplification results in louder, tinnier, and more abrasive audio playback. The next slope 1010 represents the audio output of only the speaker mounted to the power supply. Audio data, whether in analog or digital form, is able to be transmitted to the power supply using any of the means described in FIG. 3-7, or any other known or convenient means or methods. As a result of audio reproduced by a speaker not restricted by such a small form factor requirements, the audio response is greatly improved across the low end of the hearing spectrum. At 50 Hz, the power supply speaker is able to reproduce audio with a 10 dB improvement with respect to the notebook speakers. At 100 Hz, the improvement is nearly 20 dB. It will be appreciated that the overall result is a deeper, richer bass response with respect to the laptop's on board speakers. The next slope 1020 shows the combined effects of the notebook speakers and the speaker on board the power supply. What is shown is an overall improvement across the entire hearing spectrum with respect to the sole use of the speaker mounted on the power supply or the sole use of the on board speakers on the laptop computer. FIG. 10 shows the slope 2010 of FIG. 9 with four different gain settings for the audio amplifier on board the power supply. In an exemplary embodiment, four discrete gain settings are available, settable for example by the volume and on/off controls in the embodiments shown in FIGS. 3-7. Alternatively, the gain settings are able to be dynamic, and controlled on board the laptop computer, the power supply, or by a control switch or knob mounted on the power cable coupling the power supply to the laptop computer. The first curve 1010 represents a gain of −10 dB, the second curve 1020 represents −6 dB, third curve 1030 represents −3 dB, and the top curve 1040 is set to a gain of 0 dB with respect to the provided audio signal. Advantageously, a user is able to select a gain for a desired bass response, and thereby an overall audio playback response.

In application, what is achieved is a an electrical appliance, such as a laptop computer, tablet PC, music player, or the like with enhanced audio relative to what is currently available on the market with fewer external components. Many devices, laptop computers included require a power supply to operate or recharge batteries. Generally, this power supply comprises a housing that holds a power converter. The instant invention takes advantage of the housing by including at least one speaker and various communication means, wireless or wired, to transmit audio signals to a speaker mounted on the housing. As a result, more full, rich sound is achieved without additional components, such as external powered speakers. The present invention has been described in terms of specific embodiments incorporating details to facilitate the understanding of the principles of construction and operation of the invention. The specific configurations shown in relation to the various modules and the interconnections therebetween are for exemplary purposes only. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:

1. A power supply for an electrical appliance comprising:
   a. a housing comprising:
      1. a power converter for providing power to the electrical appliance;
      2. a speaker for generating sound; and
      3. a female receptacle module through an aperture in the housing, the female receptacle including an enclosure and contacts at a bottom of the enclosure, wherein the enclosure includes an opening sized and configured to receive a jack, wherein the female receptacle contains a power connector substantially circumscribing the receptacle for an audio connector; and
   b. a cord for coupling at least one audio signal from the electrical appliance to the speaker at the female receptacle module at the opening.

2. The power supply of claim 1 further comprising at least one additional speaker.

3. The power supply of claim 1 further comprising at least one output in the housing for coupling at least one additional external speaker.

4. The power supply of claim 1 wherein the audio signal comprises digital audio data.

5. The power supply of claim 4 further comprising a decoder for decoding the digital audio data.

6. The power supply in claim 1 wherein the cord delivers electrical signals between the power converter and the electrical appliance.

7. The power supply of claim 1 further comprising an amplifier circuit for amplifying the audio signal, the driver coupled to the communication means and the speaker.

8. The power supply of claim 7 wherein the power converter provides power to the amplifier circuit.

9. The power supply of claim 7 wherein the amplifier circuit comprises a Class A/B amplification stage.

10. The power supply of claim 7 wherein the amplifier circuit comprises a Class D amplification stage.

11. The power supply of claim 1 wherein the cord includes a connector for coupling to the electronic appliance, the connector comprising:
   a. an audio jack electrically coupled to at least one wire; and
   b. a power jack coupled to a power cable.

12. The power supply of claim 11 further comprising a second power jack to receive a DC voltage.

13. The power supply of claim 11 wherein the at least one wire and the power cable are housed in a single sheath.

14. The connector of claim 11 wherein the power jack substantially circumscribes the audio jack.

15. The connector of claim 11 wherein the power jack and audio jack are integrally formed.

16. The connector of claim 11 wherein the audio jack is integral to the power jack.

17. The connector of claim 11 wherein the audio jack is adjacent to the power jack.

18. The power supply of claim 1 wherein the female receptacle module includes a plurality of concentric receptacles for receiving power and audio signal.

19. The power supply of claim 1 wherein the female receptacle module includes a first receptacle adjacent to a second receptacle for receiving power and audio signal.

20. The power supply of claim 1 wherein the contacts are board contacts.

21. The power supply of claim 1 wherein the contacts are for power and audio signals.

22. The power supply of claim 1 wherein the power converter is an AC/DC power converter, wherein the power converter receives AC power from a wall socket and transmits DC power over the cord to the electrical appliance.

23. The power supply of claim 1 further comprising a power amplifier, wherein the power amplifier receives DC power from the power converter.

24. The power supply of claim 1 wherein the housing includes two parts, wherein the first part supports the speaker and a speaker grill thereon, and wherein the second part receives the power converter and the female receptacle module.

25. A system comprising:
   a. an electrical appliance;
   b. a power supply module having a housing external to the electrical appliance for providing power to the electronic appliance, wherein the housing comprising:
      1. a female connector accessible through an aperture in the housing, the female connector including an enclosure and contacts at a bottom of the enclosure, wherein the enclosure includes an opening sized and configured to receive a jack, wherein the female connector includes a receptacle for a power connector substantially circumscribing a receptacle for an audio connector;
      2. a power converter for converting an available power to an appropriate power for the electronic appliance; and
      3. a speaker for generating sound, wherein the power converter and speaker are mounted within the housing; and
   c. a cord for coupling audio signal from the electrical appliance to the power supply module, wherein the cord includes a male connector adapted to mate with the female connector at the opening.

26. The system of claim 25 wherein the audio signal comprises digital audio data.

27. The system of claim 26 wherein the power supply module further comprises a decoder for decoding the digital audio data.

28. The system of claim 25 wherein the power supply module further comprises a driver for amplifying the audio signal, the driver coupled to the communication means and the speaker.

29. The system of claim 28 wherein the power converter provides power to the driver.

30. The system of claim 28 wherein the driver comprises a Class A/B amplification stage.

31. The system of claim 28 wherein the driver comprises a Class D amplification stage.

32. The system of claim 25 wherein the receptacle for a power connector is adjacent to the receptacle for the audio connector.

33. The system of claim 25 wherein the male connector includes:
   a. an audio jack electrically coupled to the at least one wire; and
   b. a power jack coupled to a power cable.

34. The system of claim 33 wherein the at least one wire and the power cable are housed in a single sheath.

35. The connector of claim 33 wherein the power jack substantially circumscribes the audio jack.

36. The connector of claim 33 wherein the power jack and audio jack are integrally formed.

37. The connector of claim 33 wherein the audio jack is adjacent to the power jack.

38. A system comprising:
   a. a portable electrical appliance including an audio signal source for providing an audio signal;
   b. a power supply module having a housing external to the portable electrical appliance for providing power to the electronic appliance, the housing comprising:
      1. a female connector accessible through an aperture in the housing, the female connector including an enclosure and contacts at a bottom of the enclosure, wherein the enclosure includes an opening sized and configured to receive a jack, wherein the female connector includes a receptacle for a power connector substantially circumscribing a receptacle for an audio connector;
      2. a power converter for providing DC power to at least the portable electrical appliance;
      3. a speaker for generating sound; and
      4. audio processing means for manipulating audio signals from the audio signal source, wherein the power converter, audio processing means and speaker are mounted within the housing; and c. a cable including a male connector to mate with the female connector at the opening, wherein the cable for coupling the audio signals from the audio source to the audio processing means and for coupling DC power in between the portable electrical appliance and the power converter.

39. The system in claim 38 wherein the power supply module comprises at least one additional speaker mounted within the housing.

40. The system in claim 38 wherein the power supply module comprises at least one output for coupling an additional speaker.

41. The system in claim 38 wherein the power supply module comprises an amplifier circuit for amplifying the audio signals and coupling the amplified audio signals to the speaker, wherein the amplifier circuit is mounted within the housing.

42. The system in claim 41 wherein the amplifier circuit comprises any among a Class A/B and Class D circuit.

43. The system in claim 38 wherein the audio processing means comprises any among a decoder, a demodulator, a mixer, a filter, a volume control, and an on/off switch.

44. The system in claim 38 wherein the cable comprises at least one wire for coupling the audio signals from the audio source to the audio processing means and a separate wire for coupling DC power in between the portable electrical appliance and the power converter.

45. The system in claim 38 wherein the cable comprises one wire for coupling audio signals from the audio source to the audio processing means and a separate wire for coupling DC power in between the portable electrical appliance and the power converter.

46. The system in claim 45 further comprising a second wire for providing a system ground.

47. A system comprising:
  a. an audio signal source for providing an audio signal;
  b. a power supply module having a housing external to the portable electrical appliance for providing power to the electronic appliance, the housing comprising:
    1. a power converter for providing DC power to at least the portable electrical appliance;
    2. a speaker for generating sound;
    3. audio processing means for manipulating audio signals from the audio signal source;
    4. volume control coupled to and drives the speaker;
    5. a female connector includes a receptacle for a power connector substantially circumscribing a receptacle for an audio connector; and
  c. a wireless transceiver for coupling the audio signals from the audio source to the audio processing means and coupling DC power in between the portable electrical appliance and the power converter.

48. The system in claim 47 wherein the power supply module comprises at least one additional speaker mounted within the housing.

49. The system in claim 47 wherein the power supply module comprises at least one output for coupling an additional speaker.

50. The system in claim 47 wherein the power supply module comprises an amplifier circuit for amplifying the audio signals and coupling the amplified audio signals to the speaker, wherein the amplifier circuit is mounted within the housing.

51. The system in claim 47 wherein the amplifier circuit comprises any among a Class A/B and Class D circuit.

52. The system in claim 47 wherein the wireless transceiver comprises an infrared transceiver.

53. The system in claim 47 wherein the wireless transceiver comprises a bluetooth transceiver.

54. The system in claim 47 wherein the wireless transceiver comprises an RF transceiver.

55. The system in claim 47 wherein the audio processing means comprises any among a decoder, a demodulator, a mixer, a filter, and an on/off switch.

* * * * *